US006563431B1

(12) United States Patent
Miller, Jr.

(10) Patent No.: US 6,563,431 B1
(45) Date of Patent: May 13, 2003

(54) AUTOMATIC GARAGE DOOR SYSTEM AND METHOD

(76) Inventor: Jay W. Miller, Jr., 721 Santa Fe Ave., La Junta, CO (US) 81050

(*) Notice: Subject to any disclaimer, the term of this patent is extended or adjusted under 35 U.S.C. 154(b) by 0 days.

(21) Appl. No.: 09/692,074

(22) Filed: Oct. 19, 2000

(51) Int. Cl.[7] .................................................. B60Q 1/48

(52) U.S. Cl. .................... 340/932.2; 340/938; 340/993; 340/309.15; 340/330; 340/5.7; 340/5.71

(58) Field of Search ............................. 340/932.2, 933, 340/935, 938, 988, 993, 57, 435, 436, 5.71, 686.1, 686.6, 825.29, 309.15, 309.3, 330

(56) References Cited

U.S. PATENT DOCUMENTS

| | | | | | |
|---|---|---|---|---|---|
| 1,172,084 | A | | 2/1916 | Warner | |
| 2,173,105 | A | | 9/1939 | Geer et al. | |
| 2,879,350 | A | | 3/1959 | Howell | 200/61.41 |
| 3,593,263 | A | | 7/1971 | Olsen | 340/39 |
| 4,035,702 | A | | 7/1977 | Pettersen et al. | 318/285 |
| 4,145,681 | A | | 3/1979 | Bubnich et al. | 340/51 |
| 4,463,292 | A | | 7/1984 | Englemann | 318/283 |
| 4,464,651 | A | | 8/1984 | Duhame | 340/521 |
| 4,665,378 | A | | 5/1987 | Heckethorn | 340/51 |
| 4,939,434 | A | | 7/1990 | Elson | 318/285 |
| 5,027,553 | A | | 7/1991 | Vergara | 49/30 |
| 5,510,686 | A | | 4/1996 | Collier | 318/446 |
| 5,752,343 | A | | 5/1998 | Quintus | 49/29 |
| 5,781,107 | A | | 7/1998 | Ji | 340/545 |
| 5,864,134 | A | | 1/1999 | Burgess | 250/221 |
| 5,872,513 | A | * | 2/1999 | Fitzgibbon et al. | 340/539 |
| 5,883,579 | A | | 3/1999 | Schreiner et al. | 340/686 |
| 5,945,907 | A | | 8/1999 | Yaron et al. | 340/436 |
| 6,154,150 | A | * | 11/2000 | Laubach | 340/932.2 |
| 6,310,548 | B1 | * | 10/2001 | Stephens et al. | 340/540 |
| 6,346,889 | B1 | * | 2/2002 | Moss | 340/686.1 |
| 6,388,559 | B1 | * | 5/2002 | Cohen | 340/5.71 |

OTHER PUBLICATIONS www.dooralert.com, pp. 1–5, a device for indicating whether a garage door is open.

www.dooralert.com/switch.html, www.dooralert.com/switch.html.

www.dooralert.com/components.html, www.dooralert.com/about.html.

* cited by examiner

*Primary Examiner*—Daryl Pope

(74) *Attorney, Agent, or Firm*—Law Office of Dale B. Halling, LLC

(57) ABSTRACT

An automatic garage door system includes a controller. The controller receives information on the vehicle's position from a vehicle parking unit. When the automatic system is on, the system determines if the garage door is open via a garage door position sensor. When the garage door is open, the controller signals a remote interface unit located inside the house to indicate that the garage door is open. The vehicle parking unit determines if a car is entering or leaving the garage. When no vehicle is entering or leaving the garage, the garage door is automatically closed after a predetermined time interval. When a vehicle is entering the garage, the vehicle's position is monitored by the vehicle parking unit, which displays the vehicle position information to the vehicle driver with a visual parking indicator.

14 Claims, 3 Drawing Sheets

AUTOMATIC GARAGE DOOR SYSTEM AND METHOD

FIELD OF THE INVENTION

The present invention relates generally to the field of a powered garage door closing systems and more particularly to an automatic garage door system.

BACKGROUND OF THE INVENTION

Electric garage door openers and vehicle parking aids are common items in many homes. Using a remote control located inside a car, or a button inside the garage, the garage door can be opened or closed at the direction of the homeowner. Many times, however, the homeowner forgets to close the garage door when he exits the garage or after he parks the car in the garage and enters the house. Current garage door openers have no provision to deal with a garage that is left open and unattended. An open and unattended garage is an invitation to crime.

Another problem faced by homeowners is damage to the house or vehicle due to parking the vehicle improperly. Damage to the vehicle and the garage may occur if the vehicle strikes the garage. Damage to the vehicle and the garage door may occur if the garage door strikes the vehicle. A vehicle must be carefully positioned within a garage. Pulling too far into the garage may prevent access around the front of the vehicle. If the vehicle is not driven in far enough, the access around the rear of the vehicle will be reduced, or worse, the garage door may damage the car when the door is lowered.

Thus there exists a need for an integrated automatic garage door closing system that solves the problem of inadvertently leaving the garage door open and directs the vehicle to park in an appropriate position.

DETAILED DESCRIPTION OF THE DRAWINGS

A method of operating an automatic garage door system includes a controller. The controller receives information on the vehicle's position from a vehicle parking unit. When the automatic system is on, the system determines if the garage door is open via a garage door position sensor. When the garage door is open, the controller signals a remote interface unit located inside the house to indicate that the garage door is open. The vehicle parking unit determines if a car is entering or leaving the garage. When no vehicle is entering or leaving the garage, the garage door is automatically closed after a predetermined time interval. When a vehicle is entering the garage, the vehicle's position is monitored by the vehicle parking unit, which displays the vehicle position information to the vehicle driver with a visual parking indicator.

The benefits of such a system are that a vehicle may be parked in the garage without damage while using garage space efficiently, and when the garage door is inadvertently left open, the system signals the homeowner that the door is open, and automatically closes the garage door. Thus, the system improves the home's safety and security.

Figure 1:
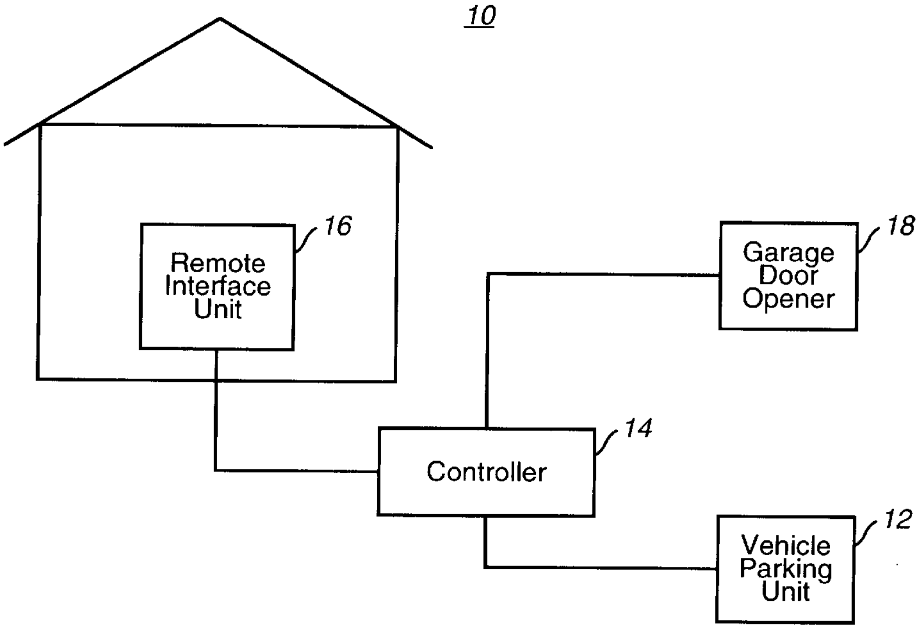
FIG. 1 is a block diagram depicting an automatic garage door system in accordance with one embodiment of the invention.

FIG. 1 is a block diagram depicting an automatic garage door system 10 in accordance with one embodiment of the invention. The vehicle parking unit 12 senses vehicle motion and position and sends this information to the controller 14. The controller 14 signals the remote interface unit 16, located inside the house, when the garage door is open. After a predetermined amount of time, the controller 14 activates garage door opener 18 to close the garage door. In one embodiment, a garage door position sensor is connected to the controller 14. In another embodiment, the remote interface unit 16 includes a switch to operate the garage door. In another embodiment, the remote interface unit 16 includes an indicator and a battery. The battery provides power to illuminate the indicator incase of household power failure. In another embodiment, the vehicle parking unit 12 includes a vehicle position sensor and visual parking indicator. The visual parking indicator may be a light emitting diode. In another embodiment, the controller 14 includes a function selector. The function selector allows the home owner to select a variety of automatic operating modes. The variety of function options may include automatic operation only when a vehicle exits the garage, only when a vehicle enters the garage, when a vehicle both enters and exits the garage, or canceling automatic operation entirely. The controller 14 may include a delay circuit to allow enough time for the vehicle to clear the garage door before the system closes the garage door.

Figure 2:
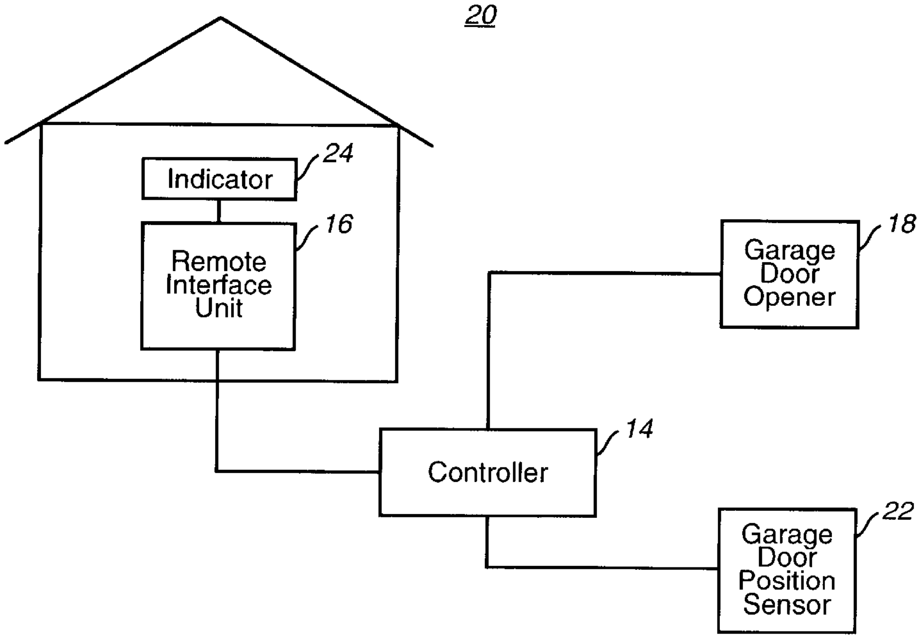
FIG. 2 is a block diagram depicting an automatic garage door system in accordance with one embodiment of the invention.

FIG. 2 is a block diagram depicting an automatic garage door system in accordance with one embodiment of the invention. Garage door position information is sent from the garage door position indicator 22 to the controller 14. When the garage door is open, the controller 14 signals the remote interface unit 16, located inside the house. The remote interface unit 16 activates an indicator 24 in response to an open garage door indication. The indicator 24 is visible inside the house and alerts the occupants of the house that the garage door is open. In one embodiment, the controller is connected to a vehicle parking unit that may include a vehicle position sensor.

Figure 3:
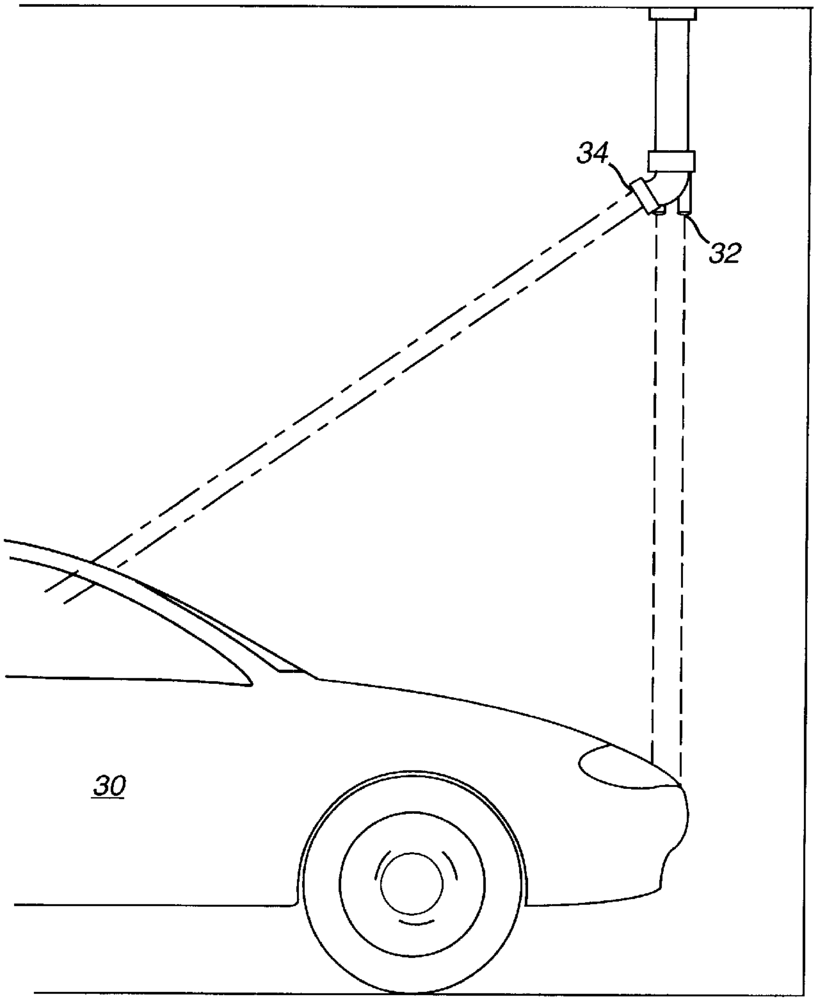
FIG. 3 is a diagram depicting the orientation of elements of the automatic garage door system in accordance with one embodiment of the invention.

FIG. 3 is a diagram depicting the orientation of elements of the automatic garage door system in accordance with one embodiment of the invention. As vehicle 30 approaches its parking position, the vehicle position sensor 32 is triggered. In response to the triggering of the vehicle position sensor 32, the visual parking indicator 34, which is visible from vehicle 30, indicates the vehicle position to the driver. When the vehicle 30 is in its proper parking position, the visual parking indicator 34 gives the appropriate indication, signaling the driver to stop. In one embodiment, the visual parking indicator includes colored light emitting diodes, for example, red, yellow, and green, to indicate vehicle position.

Figure 4:
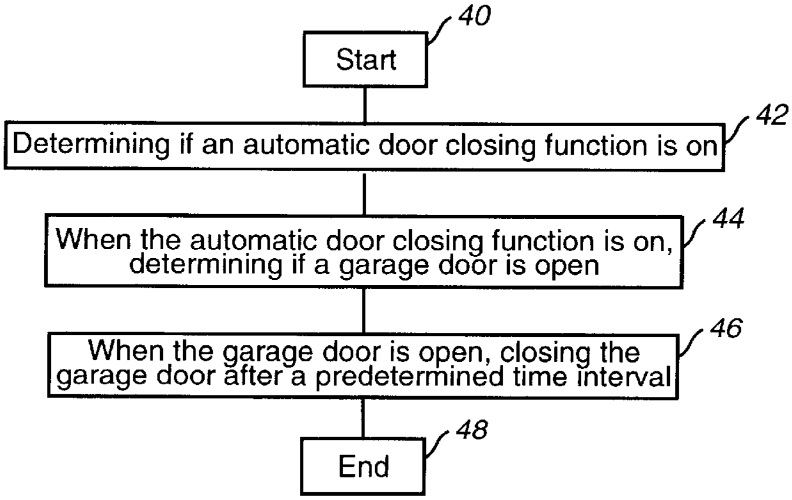
FIG. 4 is a flow chart of the steps used in a method of operating an automatic garage door system in accordance with one embodiment of the invention.

FIG. 4 is a flow chart of the steps used in a method of operating an automatic garage door system in accordance with one embodiment of the invention. The process starts, step 40, by determining if an automatic door closing function is on at step 42. When the automatic door closing function is on, the system determines if the garage door is open at step 44. When the garage door is open, the system closes the garage door after a predetermined time interval at step 46 which ends the process at step 48. In one embodiment, the system determines if a vehicle is leaving the garage, and when the vehicle is not leaving the garage, the garage door is left open. If the system determines that a vehicle is entering the garage, the system monitors the vehicle's position and displays the vehicle's position on a visual parking indicator. In another embodiment, the remote interface unit indicates that the garage door is open when the remote interface unit receives a garage door open signal. The remote interface unit is located inside the house in a bedroom or a centrally-located area, allowing the homeowner to close the garage door without going to the garage. In another embodiment, the system determines if a second vehicle is leaving the garage when the first vehicle is leaving. If the second vehicle is leaving the garage within a predetermined time interval, the automatic garage door closure operation is canceled until the second vehicle has left the garage.

Figure 5:
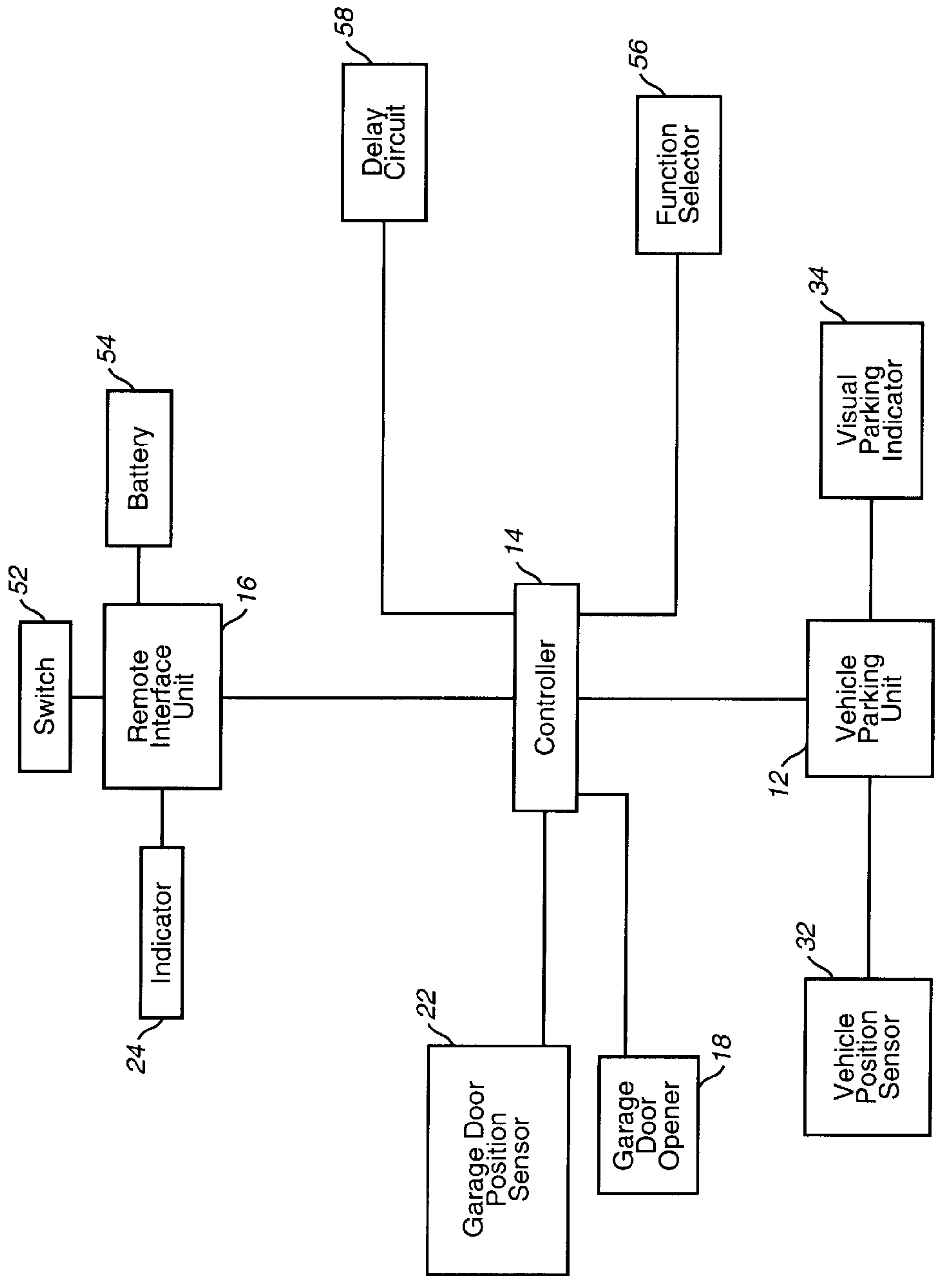
FIG. 5 is a block diagram depicting an automatic garage door system in accordance with one embodiment of the invention.

FIG. 5 is a block diagram depicting an automatic garage door system 50 in accordance with one embodiment of the invention. A garage door position sensor 22 is connected to the controller 14. A garage door opener 18 is connected to the controller 14. A vehicle parking unit 12 is connected to the controller 14. The vehicle parking unit 12 has a vehicle position sensor 32 connected to it. The vehicle parking unit 12 further has a visual parking indicator 34 connected to it. A function selector 56 and a delay circuit 58 are connected to the controller 14. Further, a remote interface unit 16 is connected to the controller 14. The remote interface unit 16 is connected to an indicator 24, a switch 52, and a battery 54.

The garage door position sensor 22 determines whether the garage door is open and signals the controller 14. When the garage door is not open, nothing further happens until the garage door position sensor 22 determines that the garage door is open. When the garage door is open, the controller signals the remote interface unit 16. The remote interface unit is located inside the house in a bedroom or a central location, allowing the homeowner to operate the garage door from inside the house. Upon receipt of the signal from the controller 14, the remote interface unit 16 illuminates the indicator 24 to alert the occupants of the house that the garage door is open. A switch 52 is located in the remote interface unit 16 to allow the garage door to be closed from inside the house. In case of house power failure, a battery 54 is located in the remote interface unit 16 to illuminate the indicator 24.

A function selector 56 is connected to controller 14 to permit the home owner to activate the automatic garage door closing system when a vehicle exits the garage, when a vehicle enters the garage, when a vehicle either enters or exits the garage, or to disable the automatic system.

When the garage door is open the controller 14 communicates this condition to the vehicle parking unit 12. The vehicle parking unit 12 activates the vehicle position sensor 32. The vehicle position sensor 32 determines if a vehicle is present in the garage and whether the vehicle is entering or exiting the garage. When a vehicle is detected, the vehicle position sensor 32 signals the vehicle parking unit 12. The vehicle parking unit 12 activates the visual parking indicator 34. When the vehicle has completely entered the garage, the garage door position sensor 22 determines whether the garage door is open. When the garage door is open, and the automatic garage door closing system is enabled at the function selector 56, a delay circuit 58 is activated. When the predetermined time interval of the delay circuit 58 has elapsed, the controller 14 activates the garage door opener 18, closing the garage door.

This invention solves several problems for the homeowner. The device enables the automatic closing of the garage door for entering or exiting vehicles. If the homeowner forgets to close the garage door, the system will automatically close it, improving the safety and security of the house, household goods, and its occupants. In another embodiment, the device alerts the occupants inside the house of an open garage door and permits the door to be closed from inside the house, offering convenience to the homeowner and decreasing the chances that the garage door will remain open inadvertently. The device also allows a vehicle to be parked in the same position in the garage in a repeatable manner. This decreases the likelihood of damage to the vehicle, the garage, and the garage door.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. An automatic garage door system comprising:

a controller connected to a garage door opener;

a vehicle parking unit connected to the controller wherein the vehicle parking unit includes a vehicle position sensor and a visual parking indicator; and a remote interface unit connected to the controller and located inside a house.

2. The automatic garage door system of claim 1, further including a garage door position sensor connected to the controller.

3. The automatic garage door system of claim 1, wherein the remote interface unit includes a switch to operate a garage door.

4. The automatic garage door system of claim 1, wherein the remote interface unit includes an indicator.

5. The automatic garage door system of claim 1, wherein the remote interface unit has a battery.

6. The automatic garage door system of claim 1, wherein the visual parking indicator includes a light emitting diode.

7. The automatic garage door system of claim 1, wherein the controller includes a function selector.

8. The automatic garage door system of claim 1, wherein the controller includes a delay circuit.

9. A method of operating an automatic garage door system comprising:

(a) determining if an automatic door closing function is on;

(b) when the automatic door closing function is on, determining if a garage door is open;

(c) determining if a vehicle is entering the garage;

(d) when the vehicle is entering the garage, monitoring a vehicle position with a vehicle parking unit;

(e) indicating the vehicle's position with a visual parking indicator; and (f) when the garage door is open, closing the garage door after a predetermined time interval.

10. The method of claim 9, wherein step (c) further includes the step of:

(c1) determining if a vehicle is leaving the garage; and (c2) when the vehicle is not leaving the garage, leaving the garage door open.

11. The method of claim 9, wherein step (b) further includes the step of:

(b1) when the garage door open signal is received, indicating that the garage door is open at a remote interface unit in a house.

12. The method of claim 9, further including the step of:

(c1) when the first vehicle is leaving the garage, determining if a second vehicle is leaving the garage within a predetermined time interval;

(c2) when the second vehicle is leaving the garage within a predetermined time interval, canceling the garage door closure until the second vehicle has exited the garage.

13. An automatic garage door system comprising:

a controller connected to a garage door opener;

a garage door position sensor connected to the controller;

a vehicle parking unit that includes a vehicle position sensor; and a remote interface unit, which includes an indicator, connected to the controller and located inside a house.

14. The automatic garage door system of claim 13, wherein the controller includes a function selector.

* * * * *